United States Patent [19]
Morse

[11] 3,835,875
[45] Sept. 17, 1974

[54] SAFETY CHECK VALVES FOR GAS LINES
[75] Inventor: Lynn H. Morse, Venice, Fla.
[73] Assignee: OMCO Inc., Holden, Mass.
[22] Filed: Apr. 20, 1973
[21] Appl. No.: 352,982

[52] U.S. Cl.................................... 137/75, 169/42
[51] Int. Cl.............................................. F16k 17/38
[58] Field of Search.................... 98/86; 126/287.5;
122/504.1, 504.3; 169/19, 42; 137/72–77

[56]        References Cited
          UNITED STATES PATENTS
2,012,873   8/1935   Gillen .................................... 137/75
3,473,544   10/1969  Nielsen ................................. 137/75

Primary Examiner—William R. Cline
Assistant Examiner—Richard Gerard

[57]              ABSTRACT

This device is an improvement on prior types of heat-actuated safety check valves for gas supply lines which hold the valve member from closing by use of fusible metal restraining means linking the valve member to its housing. Here the fusible metal is formed as a solid body retained in a hollow plug screwed through the valve housing, with an open-coil spring imbedded in the fusible metal and forming a flexible linkage between the fusible metal and the valve member holding the valve open.

1 Claim, 2 Drawing Figures

PATENTED SEP 17 1974
3,835,875
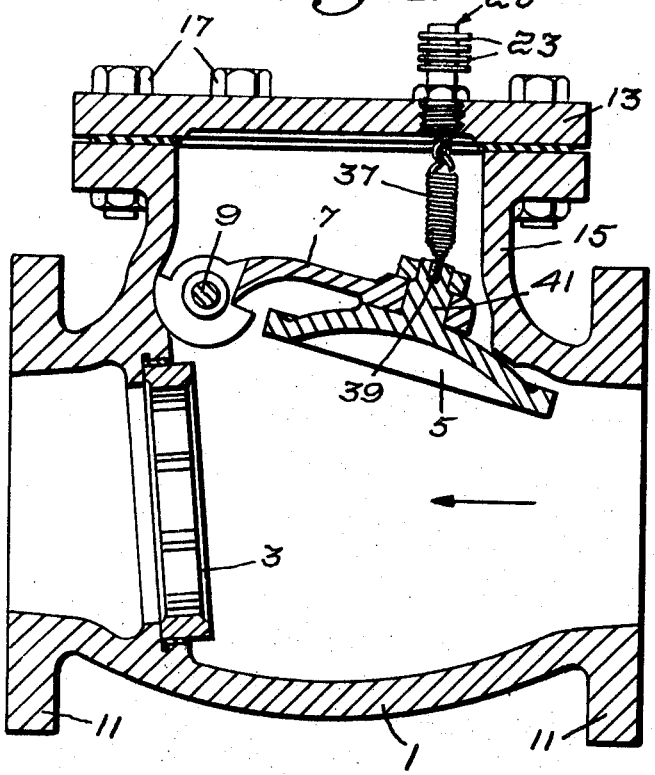
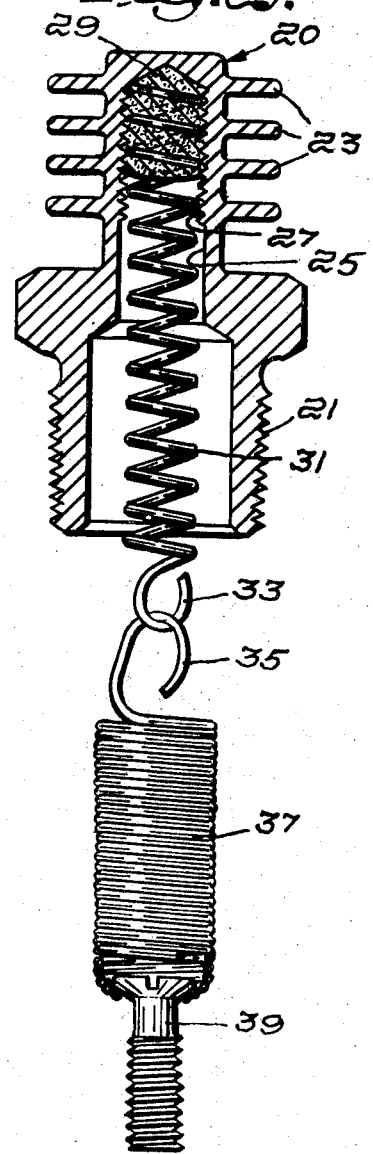

SAFETY CHECK VALVES FOR GAS LINES

The present invention is an improvement in the construction and operation of the safety check valve of Nielsen U.S. Pat. No. 3,473,544, granted Oct. 21, 1969, with the objects of making such device easier and cheaper to make, more certain to act, and, most important, substantially proof against needless and false actuation.

These devices are widely used in the gas supply lines of users of gas in large quantities, such as industrial plants, apartments, and in many situations where continuous supply must be assured, yet where positive shut-off must be effected in case of fire. Needless interruption of the gas supply can cost industrial users such tremendous losses through stopping continuous heat-treating and other gas-reliant processes, as glass-molding, for example, that gas companies are frequently under penalties of forfeiture of $25,000 or more for failure of supply.

The device of the above patent employs a solid metallic plunger slidably mounted in a recess in a plug screwed into the cover plate of the bonnet of the check valve housing, the plunger being linked to the swinging gravitating gate or closure member of the valve by a closed-coil spring so as to hold the valve open by preventing it from dropping under the pull of gravity. The plunger is normally held from movement out from the plug by low-temperature-fusible metal flowed into a clearance between the opposing corrugated surfaces of portions of the plunger and of the recess in the plug. But in the event of fire, the fusible metal melts and releases the plunger to permit closing of the valve.

I have found room for improvement in the construction and operation of this prior device which has to have a spring striving constantly to expel the plunger so as to keep it from binding in the passage in the plug due to the oblique angle of pull of the swinging gate and the linking spring as the gate descends upon melting of the fusible metal. This is particularly true in small sizes of valves. But in addition to the weight of the swinging gate this spring loading keeps a further constant stress on the fusible metal, resulting occasionally in cold flow of the fusible metal, release of the plunger, and needless stoppage of the flow of gas.

On the other hand, in the event of fire even with such spring loading the plunger sometimes manages to stick in the recess in the plug because it is rigid, preventing the valve from closing as intended.

The prior construction is difficult to assemble, as such must be done with the expelling spring under full tension while heat is being applied to melt the fusible metal, and if applied too rapidly, too scantily, or to only one side of the plug the metal while being applied does not stay wholly fluid, is pried up out of its proper location in the recess, and fails to bond the knurled portion of the plunger to the threaded part of the recess completely as needed.

Further, all parts of the prior device must or should be made of stainless steel to prevent corrosion in the course of time which could block the escape of the plunger from the plug in the event of fire. The expense of the material and machining of the plunger comprise a large part of the cost of production.

The simplified and improved construction of my invention replaces the rigid plunger and its loading spring by a simple open-coil spring with an eye on one end and with its other end imbedded in fusible metal cast in the closed end of the recess in the plug.

An illustrative form of the invention is shown in the accompanying drawing, in which FIG. 1 is a view in vertical axial section through a conventional check valve, with the improved device of the invention installed therein.

FIG. 2 is an axial section through the heat-responsive element controlling the closing of the check valve.

The check valve of FIG. 1 is of common construction and operation, comprising a body or housing 1 having flow-arresting means comprising a valve seat 3 and a valve closure member 5 conforming thereto carried by an arm 7 pivotally mounted on an axle 9 fixed by its ends in the body 1. Flanges 11 on the body enable it to be coupled into a gas pipeline (not shown) in usual manner and a plate 13 closes the bonnet 15 and gives access upon occasion to the interior of the body 1. Bolts 17 hold the plate 13 on, all as in the above patent or as preferred.

The novel heat-responsive valve-controlling means comprises a hollow plug 20 fixed as by thread 21 in the plate 13 and having heat-collecting fins 23 on its exposed outer end. The portion of its bore 25 lying within the finned part of the plug is serrated as by screw thread 27, and is occupied by a solid body 29 of a metallic alloy which will melt at a low temperature, such as 147° F. fusible solder, in which is imbedded a plurality of coils of an open-wound spring 31. The other end of this spring is twisted to form an eye 33, with which is engaged an eye 35 on one end of a spring 37 in whose tapered other end is held the head of a screw 39 which is threaded into the stem 41 of valve member 5 to hold the valve open, the valve assembly being installed in the erect position shown in FIG. 1.

The simplification of this device in this manner has numerous advantages. The extensive machining of the specially formed plunger occupying the plug in the prior type is avoided. The thin shell of fusible metal between such plunger and the inner wall of the plug with its tendency to crumble with age and to cold flow is replaced by a solid body. The loaded spring constantly stressing the fusible metal is eliminated, and the binding of the plunger which such spring was aimed to overcome is avoided by the flexibility of the spring 31. The clearances are so generous that the need to use stainless steel to avoid jamming through corrosion of the prior plunger is obviated, with material economy. But even if non-corrodible metal be employed, the difference in cost of material between the heavy solid plunger and the simple spring 31 is obvious.

By using the open-wound spring 31, the method of assembly is made simple, certain, and rapid. A basket holding ten or more of the plugs 20 in inverted relation is set in water hotter than the melting point of the fusible metal until the plugs exceed such temperature, a ladle holding a measured amount of the molten metal is emptied into the bore 25 of each plug, a spring 31 is inserted in the bore, making sure that it reaches the bottom, and then the basket with its plugs therein is shifted into cooling water and the job is done. There is little or no room for error.

While I have illustrated and described certain forms in which the invention may be embodied, I am aware that many modifications may be made therein by any person skilled in the art, without departing from the scope of the invention as expressed in the claims.

Therefore, I do not wish to be limited to the particular forms shown, or to the details of construction thereof, but What I do claim as my invention is:

1. Safety check valve having in combination a valve body, flow-arresting means therein, and heat-responsive devices to prevent such means from arresting the flow including a hollow plug fixed in the valve body, a solid body of low-temperature-fusible metal fixed to the interior wall of the hollow plug, and flexible means linked to the flow-arresting means and including an open-wound coil spring having a plurality of its coils imbedded in the body of fusible metal, holding the flow-arresting means in a valve open position.

* * * * *